United States Patent
Sasaki et al.

(10) Patent No.: US 9,279,826 B2
(45) Date of Patent: Mar. 8, 2016

(54) INERTIAL FORCE SENSOR WITH A CORRECTION UNIT

(75) Inventors: Takeshi Sasaki, Osaka (JP); Takeshi Uemura, Osaka (JP); Isao Hattori, Osaka (JP); Takashi Kawai, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 395 days.

(21) Appl. No.: 13/885,608

(22) PCT Filed: Dec. 2, 2011

(86) PCT No.: PCT/JP2011/006755
§ 371 (c)(1),
(2), (4) Date: May 15, 2013

(87) PCT Pub. No.: WO2012/077314
PCT Pub. Date: Jun. 14, 2012

(65) Prior Publication Data
US 2013/0233046 A1    Sep. 12, 2013

(30) Foreign Application Priority Data
Dec. 6, 2010 (JP) ................................. 2010-271055

(51) Int. Cl.
*G01P 21/00* (2006.01)
*G01C 19/5776* (2012.01)

(52) U.S. Cl.
CPC ............ *G01P 21/00* (2013.01); *G01C 19/5776* (2013.01)

(58) Field of Classification Search
CPC ........ G01P 21/00; G01P 25/005; G01P 25/00
USPC ..................................... 73/1.38, 1.39, 514.12
See application file for complete search history.

(56) References Cited

U.S. PATENT DOCUMENTS

| 6,584,841 B1 | 7/2003 | Ichinose et al. |
| 2009/0009471 A1 | 1/2009 | Yamamoto et al. |

(Continued)

FOREIGN PATENT DOCUMENTS

| JP | 03-004215 U | 1/1991 |
| JP | 06-294652 A | 10/1994 |

(Continued)

OTHER PUBLICATIONS

International Search Report for PCT/JP2011/006755 dated Feb. 14, 2012.

(Continued)

*Primary Examiner* — Hezron E Williams
*Assistant Examiner* — Nashmiya Fayyaz
(74) *Attorney, Agent, or Firm* — Pearne & Gordon LLP

(57) ABSTRACT

An inertial force sensor of the present invention includes a detection element, a detection circuit for detecting the amount of inertia corresponding to the inertial force applied to the detection element; a first low-pass filter connected to the output side of the detection circuit; and a correction circuit for correcting the output of the first low-pass filter. The correction circuit includes a correction amount generation unit connected to the output side of the first low-pass filter; a correction amount storage unit connected to the output side of the correction amount generation unit; and a correction unit connected to the output side of the first low-pass filter and to the output side of the correction amount storage unit. The correction unit corrects an output value of the first low-pass filter based on a correction amount stored in the correction amount storage unit.

5 Claims, 13 Drawing Sheets

(56) References Cited

U.S. PATENT DOCUMENTS

| | | |
|---|---|---|
| 2009/0295722 A1 | 12/2009 | Yamamoto |
| 2011/0063458 A1* | 3/2011 | Washisu et al. ............ 348/208.2 |
| 2014/0007645 A1* | 1/2014 | Uemura et al. ................ 73/1.08 |

FOREIGN PATENT DOCUMENTS

| | | |
|---|---|---|
| JP | 10-253359 A | 9/1998 |
| JP | 10-253360 A | 9/1998 |
| JP | 10-318757 A | 12/1998 |
| JP | 11-281360 A | 10/1999 |
| JP | 2000-088578 A | 3/2000 |
| JP | 2000-148379 A | 5/2000 |
| JP | 2003-106840 A | 4/2003 |
| JP | 2008-247109 A | 10/2008 |
| TW | 200910164 | 3/2009 |
| TW | 201009653 | 3/2010 |

OTHER PUBLICATIONS

English Translation of Taiwanese Search Report for Application No. 100144630 dated Jun. 5, 2015.

* cited by examiner

US 9,279,826 B2

INERTIAL FORCE SENSOR WITH A CORRECTION UNIT

This application is a U.S. national stage application of the PCT international application No. PCT/JP2011/006755.

TECHNICAL FIELD

The present invention relates to an inertial force sensor, such as an angular velocity sensor or an acceleration sensor, that can be used in input devices of mobile phones, smartphones, image stabilizers of digital still cameras, and car navigation and control systems.

BACKGROUND ART

FIG. 12 is a block diagram of a conventional inertial force sensor. As shown in FIG. 12, conventional inertial force sensor 1 includes detection element 2, detection circuit 3 for detecting the amount of inertia corresponding to an inertial force applied to detection element 2, low-pass filter 4 connected to the output side of detection circuit 3, and correction circuit 5 for correcting the output of low-pass filter 4. Correction circuit 5 includes correction amount storage unit 6 to storing a correction amount from outside and correction unit 7 connected to the output side of low-pass filter 4 and to the output side of correction amount storage unit 6. Correction unit 7 corrects the output value of low-pass filter 4 based on the correction amount stored in correction amount storage unit 6.

Inertial force sensor 1 is required to output zero or a predetermined reference value when having no inertial force is applied thereto. When an inertial force is applied, sensor 1 is required to output an output corresponding to the inertial force. To achieve this function, before the shipping of conventional inertial force sensor 1 from the factory, a measurement is performed to determine the output deviation due to the production tolerance of detection element 2, and the output offset (initial offset) due to the electrical offset of detection circuit 3. Then, a correction amount is stored in correction amount storage unit 6.

An example of a conventional technique related to the present invention is shown in Patent Literature 1.

However, conventional inertial force sensor 1 shipped with the stored correction amount still has a problem that an output offset may be caused, for example, when a stress is applied to detection element 2 even if no inertial force is applied.

CITATION LIST

Patent Literature

Patent Literature 1: Japanese Patent Laid-Open Publication 2000-88578

SUMMARY

An inertial force sensor includes a detection element, a detection circuit for detecting the amount of inertia corresponding to the inertial force applied to the detection element, a first low-pass filter connected to the output side of the detection circuit, and a correction circuit for correcting the amount of inertia. The correction circuit includes a correction amount generation unit connected to the output side of the first low-pass filter, a correction amount storage unit connected to the output side of the correction amount generation unit, and a correction unit connected to the output side of the first low-pass filter and to the output side of the correction amount storage unit. The correction unit corrects an output value of the first low-pass filter based on a correction amount stored in the correction amount storage unit.

The above-described configuration can reduce the output offset even if a correction amount is stored at the time of the shipment.

DETAIL DESCRIPTION OF PREFERRED EMBODIMENTS

Exemplary Embodiment 1

Figure 1:
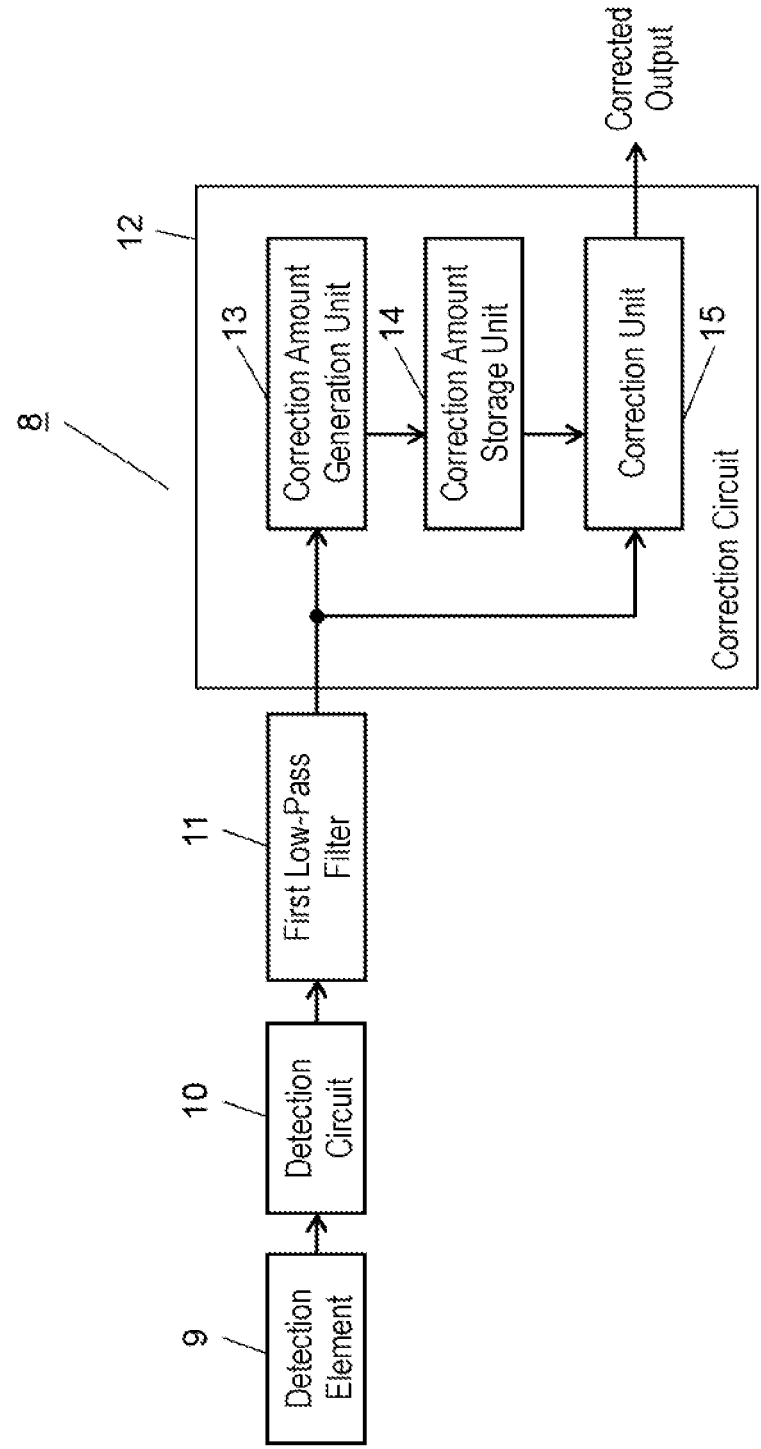
FIG. 1 is a block diagram of an inertial force sensor according to Exemplary Embodiment 1 of the present invention.

FIG. 1 is a block diagram of an inertial force sensor according to Exemplary Embodiment 1.

As shown in FIG. 1, inertial force sensor 8 includes detection element 9, detection circuit 10 for detecting the amount of inertia corresponding to an inertial force applied to detection element 9, first low-pass filter 11 connected to the output side of detection circuit 10, and correction circuit 12 for correcting the output of first low-pass filter 11. Correction circuit 12 includes correction amount generation unit 13 connected to the output side of first low-pass filter 11, correction amount storage unit 14 connected to the output side of correction amount generation unit 13, and correction unit 15 connected to the output side of first low-pass filter 11 and to the output side of correction amount storage unit 14.

Correction unit 15 corrects the output value of first low-pass filter 11 based on the correction amount stored in correction amount storage unit 14.

This configuration can reduce the output offset generated with no inertial force applied to the sensor even if a correction amount is stored in correction amount storage unit 14 at the time of its shipment.

The output offsets that can be reduced by this configuration include not only the output offset caused by the application of a stress (other than the inertial force) applied to detection element 9, but also the output offset caused by temperature fluctuation, or by the output fluctuation of the housing (not shown), detection element 9, and detection circuit 10 with time.

A specific configuration of inertial, force sensor 8 will be described below on an example of a tuning-fork-type angular velocity sensor.

Figure 2:
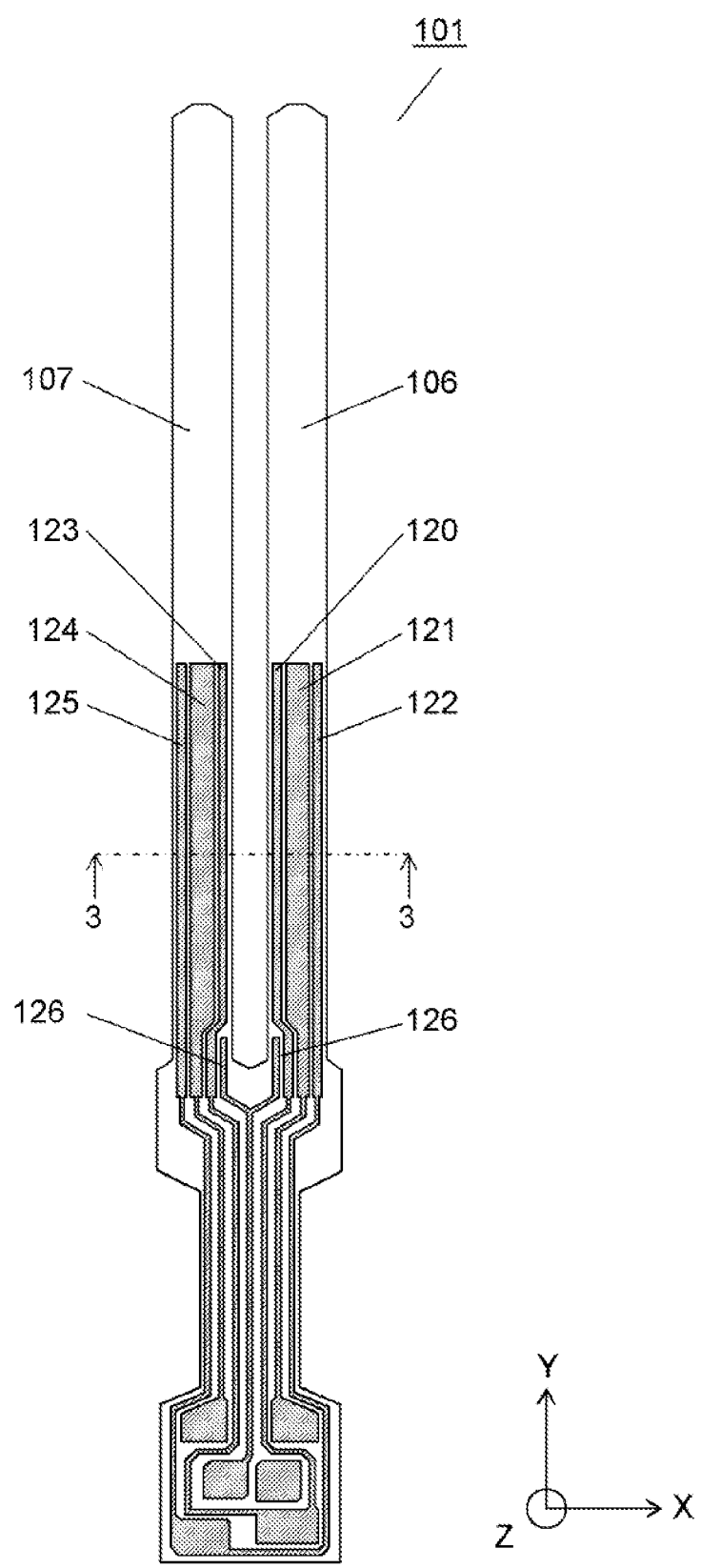
FIG. 2 shows an angular velocity sensor element according to Embodiment 1.
Figure 3:
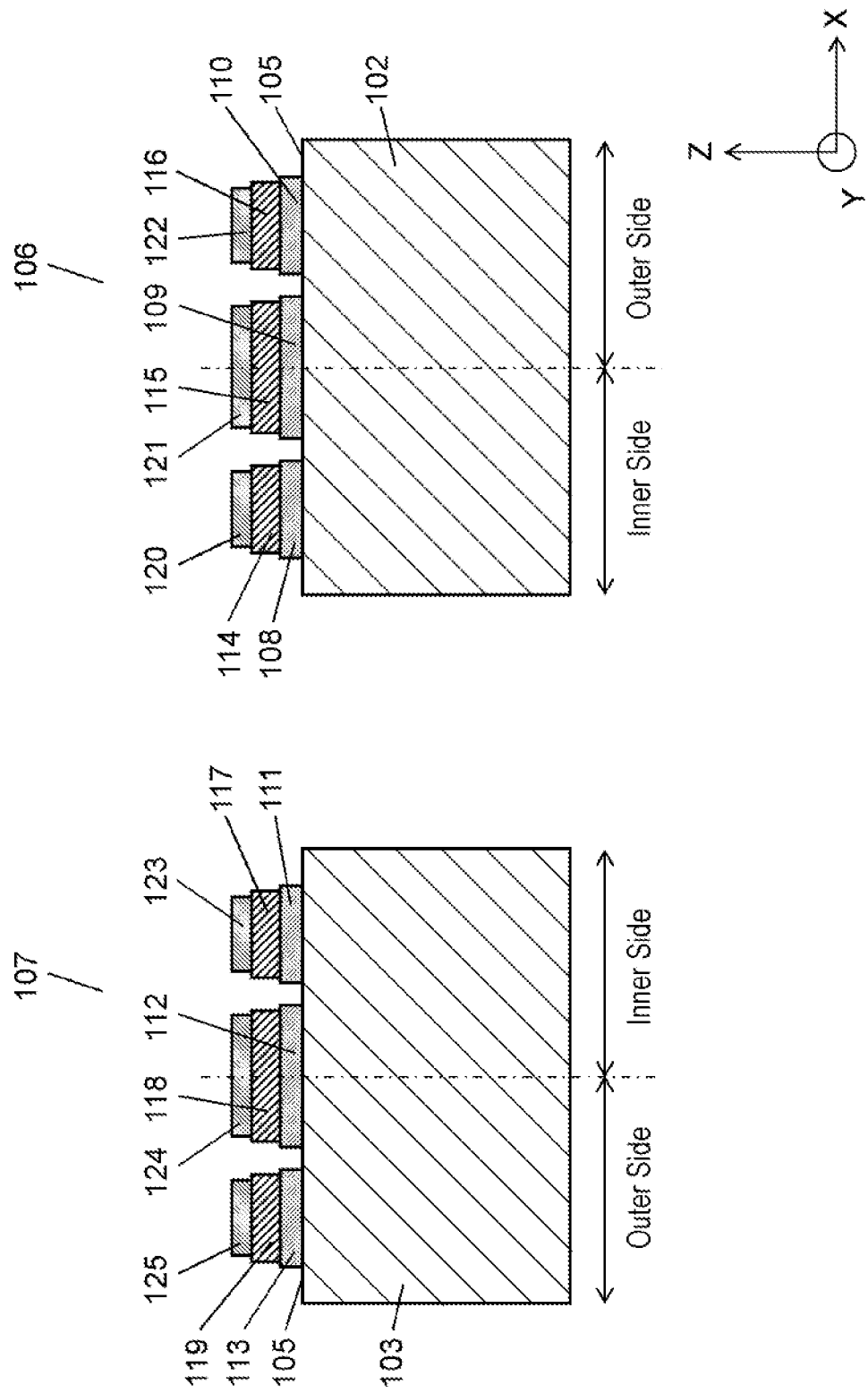
FIG. 3 is a sectional view of the angular velocity sensor element on a chain line 3-3 shown in FIG. 2.

FIG. 2 shows an angular velocity sensor element according to Embodiment 1. FIG. 2 shows tuning-fork-type angular velocity sensor element 101 as an example of detection element 9. FIG. 3 is a sectional view of angular velocity sensor element 101 on a chain line 3-3 shown in FIG. 2.

As shown in FIGS. 2 and 3, angular velocity sensor element 101 includes turning-fork-shaped silicon substrates 102 and 103 and lower electrodes 108, 109, 110, 111, 112, and 113 formed on the substrates. Angular velocity sensor element 101 further includes piezoelectric thin films 114, 115, 116, 117, 118, and 119 formed on lower electrodes 108, 109, 110, 111, 112, and 113, respectively. Angular velocity sensor element 101 further includes upper electrodes 120, 121, 122, 123, 124, and 125 formed on piezoelectric thin films 114, 115, 116, 117, 118, and 119, respectively. Upper electrodes 120, 122, 123, and 125 are driving electrodes, whereas upper electrodes 121 and 124 are sensing electrodes. Lower electrodes 108, 109, 110, 111, 112, and 113 are connected to a reference potential.

Angular velocity sensor element 101 vibrates in a direction of an X-axis shown in FIG. 2 when a predetermined driving voltage is applied to driving electrodes 120, 122, 123, and 125. If an angular velocity is applied about a Y-axis while angular velocity sensor element 101 vibrates in the direction of the X-axis, Coriolis force is generated. The Coriolis force bends arms 106 and 107 in a direction of a Z-axis so as to bend piezoelectric thin films 115 and 118, thereby generating charges on sensing electrodes 121 and 124. The amount of the charges is proportional to the Coriolis force, allowing detection of an angular velocity. Arms 106 and 107 of angular velocity sensor element 101 vibrate in opposite directions along the direction of the X-axis. Hence, the Coriolis force generated when the angular velocity about the Y axis is applied and bends arms 106 and 107 in opposite directions along the direction of the Z-axis. As a result, the charges generated on sensing electrodes 121 and 124 according to the Coriolis force have polarities opposite to each other, and therefore, allow currents flowing when sensing electrodes 121 and 124 are connected to the circuit to have polarities opposite to each other. As shown in FIG. 2, angular velocity sensor element 101 further includes monitoring electrodes 126 for extracting a signal having a frequency synchronized to driving vibration. The signal detected by monitoring electrodes 126 is used for detection by the detection circuit, which will be described below.

Figure 4:
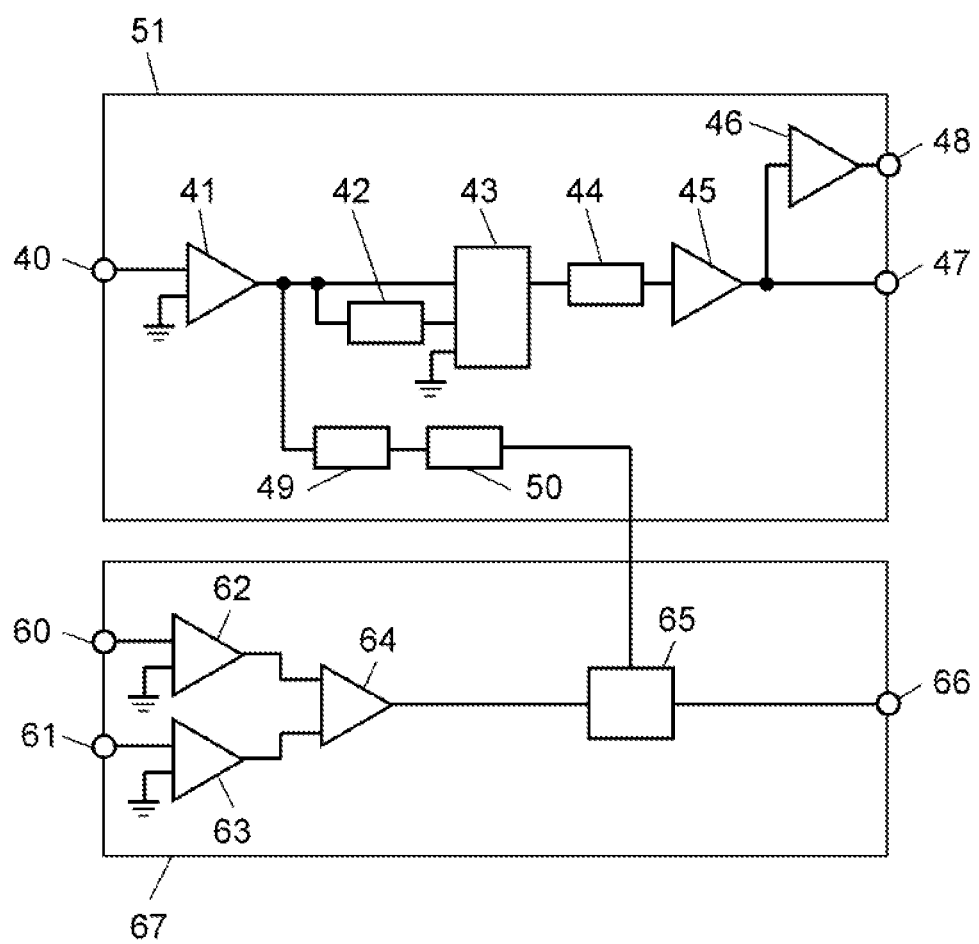
FIG. 4 is a block diagram of a detection circuit and a driving circuit according to Embodiment 1.

FIG. 4 is a block diagram of the detection circuit and a driving circuit according to Embodiment 1. Detection circuit 67 shown in FIG. 4 is an example of detection circuit 10 shown in FIG. 1. As shown in FIG. 4, detection circuit 67 includes input, terminals 60 and 61, sensing current/voltage converters 62 and 63, differential amplifier 64, synchronous detector 65, and detection output terminal 66. Input terminals 60 and 61 are electrically connected to sensing electrodes 121 and 124 of angular velocity sensor element 101 respectively. The currents having opposite polarities generated by sensing electrodes 121 and 124 of angular velocity sensor element 101 are converted into voltages by sensing current/voltage converters 62 and 63, and have a difference of the voltages calculated by differential amplifier 64 so as to be substantially added together. The output of differential amplifier 64 is input to synchronous detector 65, and then, is synchronously detected with a clock signal output from clock generator 50 of driving circuit 51, and output through detecting output terminal 66.

Driving circuit 51 is a circuit for driving angular velocity sensor element 101 shown in FIGS. 2 and 3. As shown in FIG. 4, driving circuit 51 includes monitor input terminal 40, monitor current/voltage converter 41. DC converter 42, AGC circuit 43, band-pass filter 44, output amplifier 45, inverting amplifier 46, phase shifter 49, clock generator 50, and drive, output terminals 47 and 48. Monitor input terminal 40 is electrically connected to monitoring electrodes 126. Monitor input terminal 40 inputs, to driving circuit 51, a monitor current which is generated by to the charges generated on monitoring electrodes 126 and is synchronized to the driving vibration. Monitor current/voltage converter 41 converts the monitor current into a voltage. DC converter 42 converts the monitor current thereinafter, monitor signal) converted into the voltage, into a DC signal. AGC circuit 43 amplifies the monitor signal received from monitor current/voltage converter 41 at a gain corresponding to the output of DC converter 42. Band-pass filter 44 removes undesired frequency components. Output amplifier 45 amplifies the output of band-pass filter 44. Inverting amplifier 46 inverts the output of output amplifier 45. Drive output terminals 47 and 48 are connected, to predetermined electrodes of driving electrodes 120, 122, 123, and 125 of angular velocity sensor element 101.

Monitor input terminal 40 and drive output terminals 47 and 48 of driving circuit 51 are connected to angular velocity sensor element 101 so as to form a driving loop. Then, a driving voltage is applied to angular velocity sensor element 101 by self oscillation. AGC circuit 43 has the gain decreasing as the output of DC converter 42 increases, and has the gain increasing as the output of DC converter 42 decreases. Thus, the monitor signal input to AGC circuit 43 is controlled to be substantially constant, thereby keeping; the amplitude of the driving vibration constant. Phase shifter 49 shifts the phase of the monitor signal which has been converted into a voltage by monitor current/voltage converter 41, by 90 degrees. Clock generator 50 generates a rectangular-wave clock signal for synchronous detection from the output of phase shifter 49. The output of clock generator 50 is used for the synchronous detection performed by detection circuit 67.

First low-pass filter 11 shown in FIG. 1 receives the output of detection circuit 10 and attenuates frequency components not lower than a predetermined cut-off frequency, thereby passing only frequencies including necessary angular velocity components, and suppressing some of the undesired signals.

Figure 5:
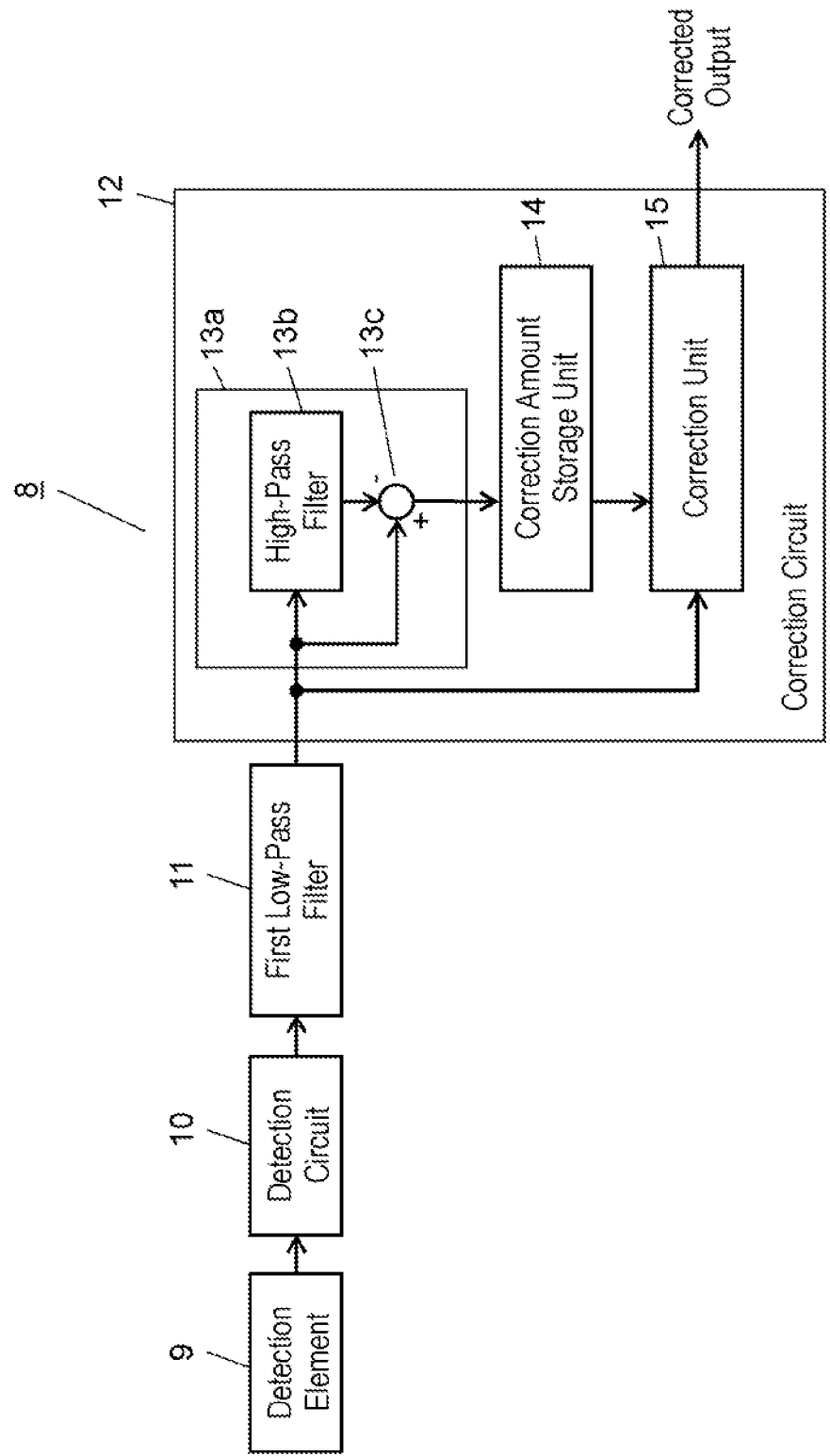
FIG. 5 shows a correction amount generation unit shown in FIG. 1.

FIG. 5 shows a correction amount generation unit shown in FIG. 1. Correction amount generation unit 13a includes high-pass filter 13b and calculation circuit 13c. High-pass filter 13b is connected to the output side of first low-pass filter 11. Calculation circuit 13c is connected to the output side of first low-pass filter 11 and to the output side of high-pass filter 13b, and outputs the difference between the output value of first low-pass filter 11 and the output value of high-pass filter 13b. First low-pass filter 11 has a cut-off frequency higher than a cut-off frequency of high-pass filter 13b. This configuration allows correction amount generation unit 13a to extract frequency components lower than the cut-off frequency of high-pass filter 13b as an output offset.

The output offset due to the change with time of detection element 9 and detection circuit 10 has a frequency lower than the frequency component of the desired angular velocity, namely, not higher than 0.001 Hz or a DC component. For example, the output offset due to external stress caused by the warpage of a substrate having inertial force sensor 8 mounted thereon has a frequency much lower than the frequency component of the desired angular velocity, and substantially appears as a DC component.

In conventional inertial force sensor 1, the output offset due to the change with time of detection element 2 and detection circuit 3 cannot be changed because it is configured to be corrected to the correction amount stored in correction amount storage unit 6 at the time of the shipment. In contrast, inertial force sensor 8 according to this embodiment can reduce the output, offset even if a correction amount is stored in correction amount storage unit 14 at the time of the shipment.

For example, when the desired angular velocity has a frequency range from 0.001 Hz to 20 Hz, the cut-off frequency of first low-pass filter 11 is set to be not lower than 20 Hz, and the cutoff frequency of high-pass filter 13b is set to be not higher than 0.001 Hz. This setting allows inertial force sensor 8 to detect angular velocities having a frequency range from 0.001 Hz to 20 Hz, and to remove undesired offset having a frequency not higher than 0.001 Hz or less.

Alternatively, the offset component having a frequency not higher than the cut-off frequency can be removed by connecting a high-pass filter in series between first low-pass filter 11 and correction unit 15, instead of providing correction amount generation unit 13. The high-pass filter has a cut-off frequency not higher than the lowest frequency of the frequency range of the desired angular velocity Only the offset component about a DC can be removed by a capacitor for removing DC components connected in series between first low-pass filter 11 and correction unit 15 instead of providing correction amount generation unit 13. These configurations, however, cause the time delay of a detected signal since the detected signal itself or the signal in the range of practical use itself passes through the high-pass filter or the capacitor. According to the present embodiment, undesired offset components can be removed without a circuit, such as a high-pass filter or a capacitor, having a large amount of delay between first low-pass filter 11 and correction unit 15.

Exemplary Embodiment 2

A difference of a sensor according to Exemplary Embodiment 2 of the present invention from Embodiment 1 will be described below.

Figure 6:
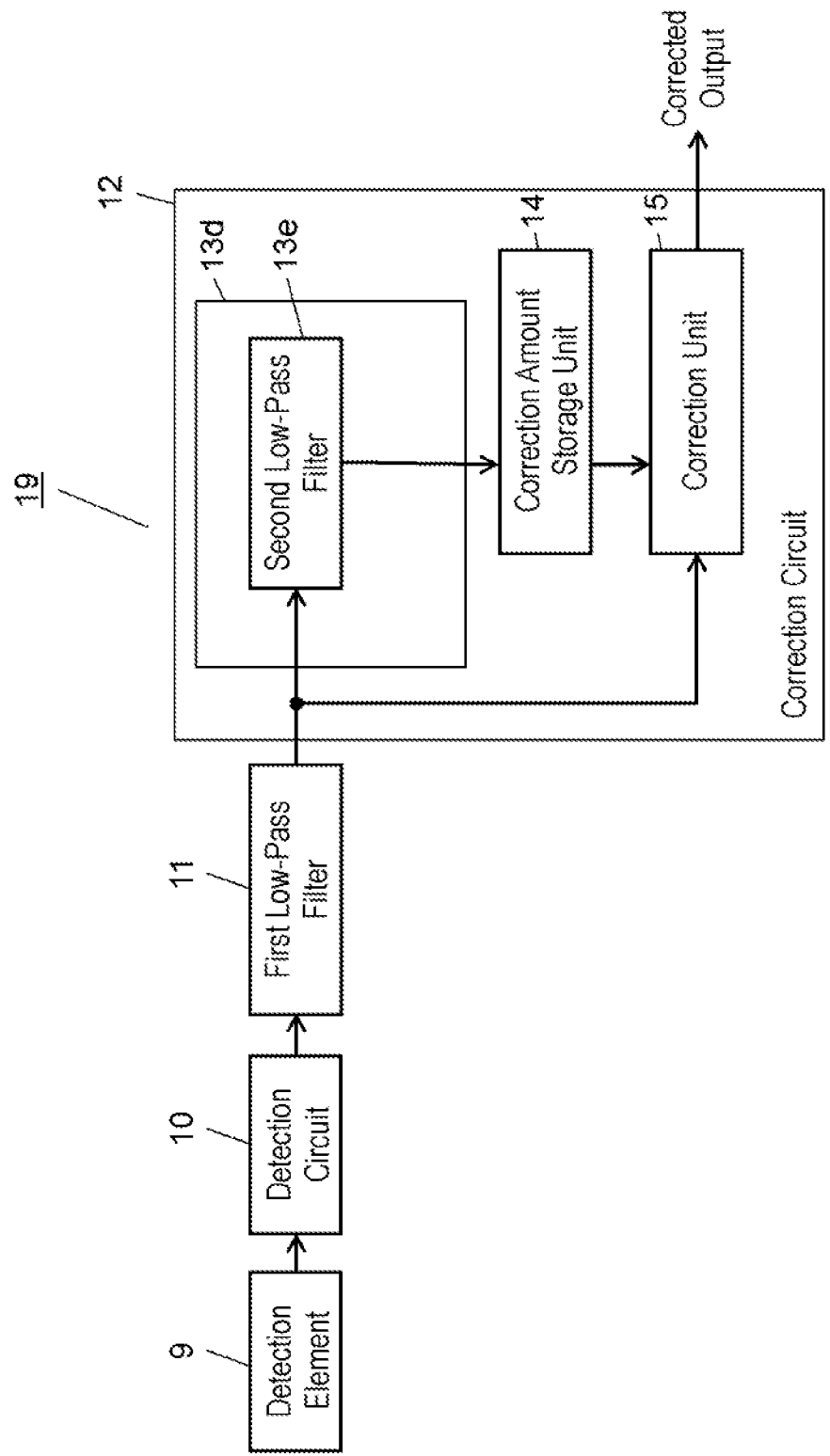
FIG. 6 is a block diagram of an inertial force sensor according to Exemplary Embodiment 2 of the invention.

FIG. 6 is a block diagram of an inertial force sensor according to Embodiment 2.

As shown in FIG. 6, inertial force sensor 19 includes correction amount generation unit 13d including second low-pass filter 13e. Second low-pass filter 13e is connected to the output side of first low-pass filter 11, whereas the output of second low-pass filter 13e is connected to correction amount storage unit 14. First low-pass filter 11 has a cut-off frequency higher than a cut-off frequency of second low-pass filter 13e. This configuration can extract a frequency component lower than the cut-off frequency of second low-pass filter 13e as an output offset.

Thus, correction amount generation unit 13d including second low-pass filter 13e can eliminate calculation circuit 13c included in the configuration shown in FIG. 5, thereby reducing the circuit area and the consumption current.

Exemplary Embodiment 3

A difference of a sensor according to Exemplary Embodiment 3 from Embodiment 1 will be described below.

Figure 7:
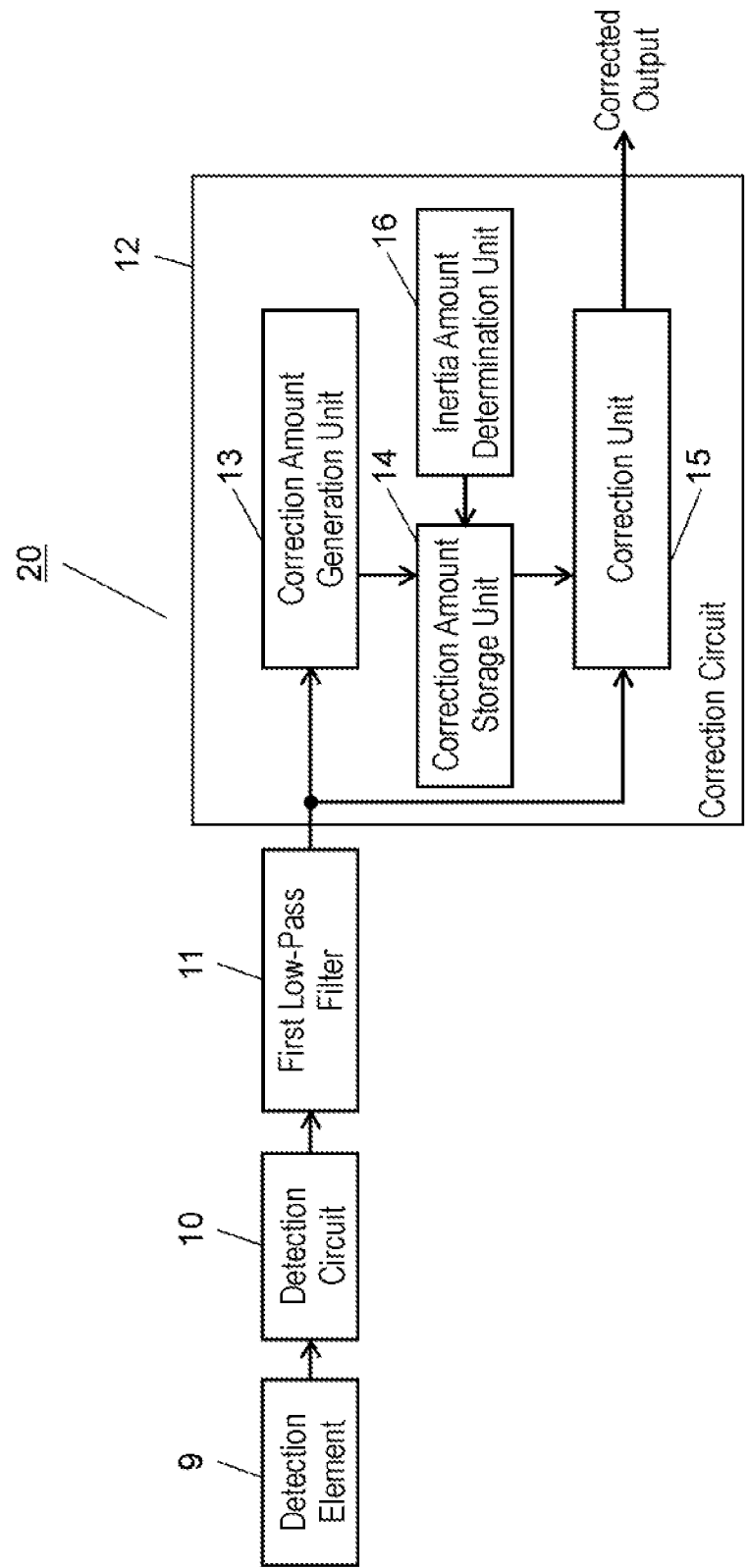
FIG. 7 is a block diagram of an inertial force sensor according to Exemplary Embodiment 3 of the invention.

FIG. 7 is a block, diagram of an inertial force sensor according to Embodiment 3.

As shown in FIG. 7, inertial force sensor 20 includes inertia amount determination unit 16 in correction circuit 12. Inertia amount determination unit 16 determines whether or not the correction amount stored in correction amount storage unit 14 is the amount of inertia. If the stored correction amount is the amount of inertia, inertia amount determination unit 16 outputs an instruction signal. If the stored correction amount is not the amount of inertia, inertia amount determination unit 16 does not output the instruction signal.

If the instruction signal from inertia amount determination unit 16 is input to correction amount storage unit 14, correction amount storage unit 14 maintains the stored correction amount output from correction amount generation unit 13, and does not update the correction amount. On the other hand, if the instruction signal from inertia amount determination unit 16 is not input to correction amount storage unit 14, correction amount storage unit 14 does not maintain the stored correction amount output from correction amount generation unit 13, and updates the correction amount.

Alternatively, if determining that the correction amount is the amount of inertia, inertia amount determination unit 16 may output an instruction signal which instructs correction amount storage unit 14 not to maintain the stored correction amount.

With this configuration, it is determined whether or not the correction amount stored in correction amount storage unit 14 is the amount of inertia, and the correction amount is updated only if the updating is necessary, thereby reducing the probability of erroneous correction.

Figure 8:
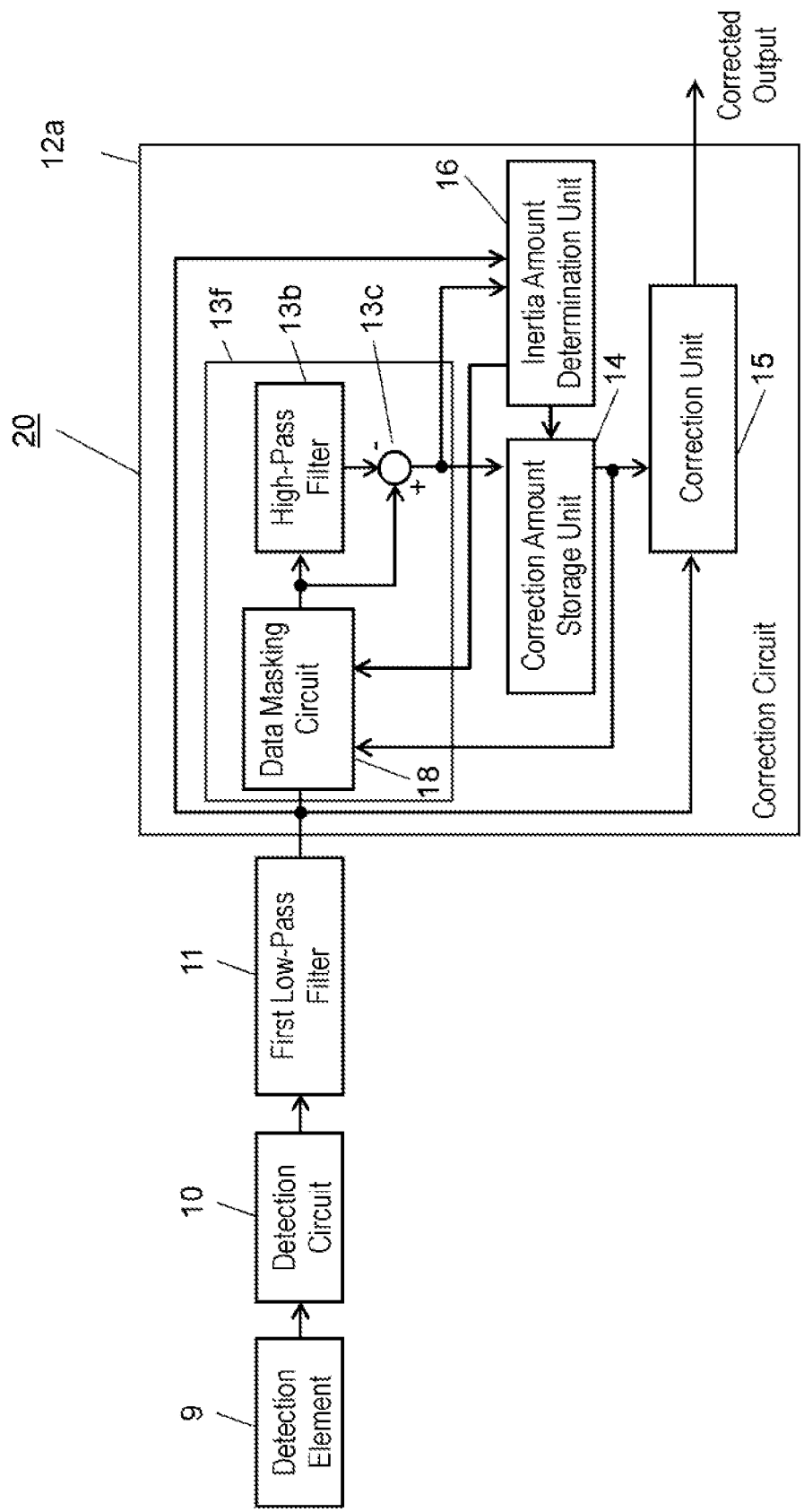
FIG. 8 is a block diagram of a correction circuit according to Embodiment 3.

FIG. 8 is a block diagram of a correction circuit according to Embodiment 3. More specifically, FIG. 8 is a block diagram of correction circuit 12a as a configuration example of the correction circuit including inertia amount determination unit 16. The output of first low-pass filter 11 and the output of calculation circuit 13c are input to inertia amount determination unit 16. This configuration allows inertia amount determination unit 16 to determine whether or not the output of calculation circuit 13c is the amount of inertia, and to determine whether or not the frequency components lower than the cut-off frequency of high-pass filter 13b are the amount of inertia. As a result, some of the frequency components lower than the cut-off frequency of high-pass filter 13b can be detected as the amount of inertia. More specifically, the frequency components of the input signal to inertia amount determination unit 16 are estimated by determining which amount of the input signal fluctuates within a predetermined time. Then, a frequency lower than the cut-off frequency of high-pass filter 13b is used as a threshold, and only fluctuation of frequency components lower than the threshold is determined, as the amount of inertia, thereby performing the correction. As a result, the detection frequency range can be adjusted without changing the cut-off frequency of high-pass filter 13b, thereby reducing erroneous correction and improving design flexibility.

Alternatively, the determination unit may determine whether or not the detected signal is the amount of inertia based on the magnitude of the detected signal which is the output of first low-pass filter 11 shown in FIG. 8. More specifically, a window having a predetermined range may be set, and when the detected signal is outside this range, the detected signal may be determined to be the amount of inertia and be not used for the correction. Thus, only the detected signal within the range of the window may be used for the correction. The detected signal may be input to high-pass filter 13b while being masked by data masking circuit 18 of correction amount generation unit 13f in a period, during which the detected signal is outside the range of the window, as described later. Data masking circuit 18 is connected to the output of first low-pass filter 11 and to the input of high-pass filter 13b. Data masking circuit 18 receives the center value of WINDOW 1 described later from correction amount storage unit 14. The operation of data masking circuit 18 is controlled by inertia amount determination unit 16.

Figure 9:
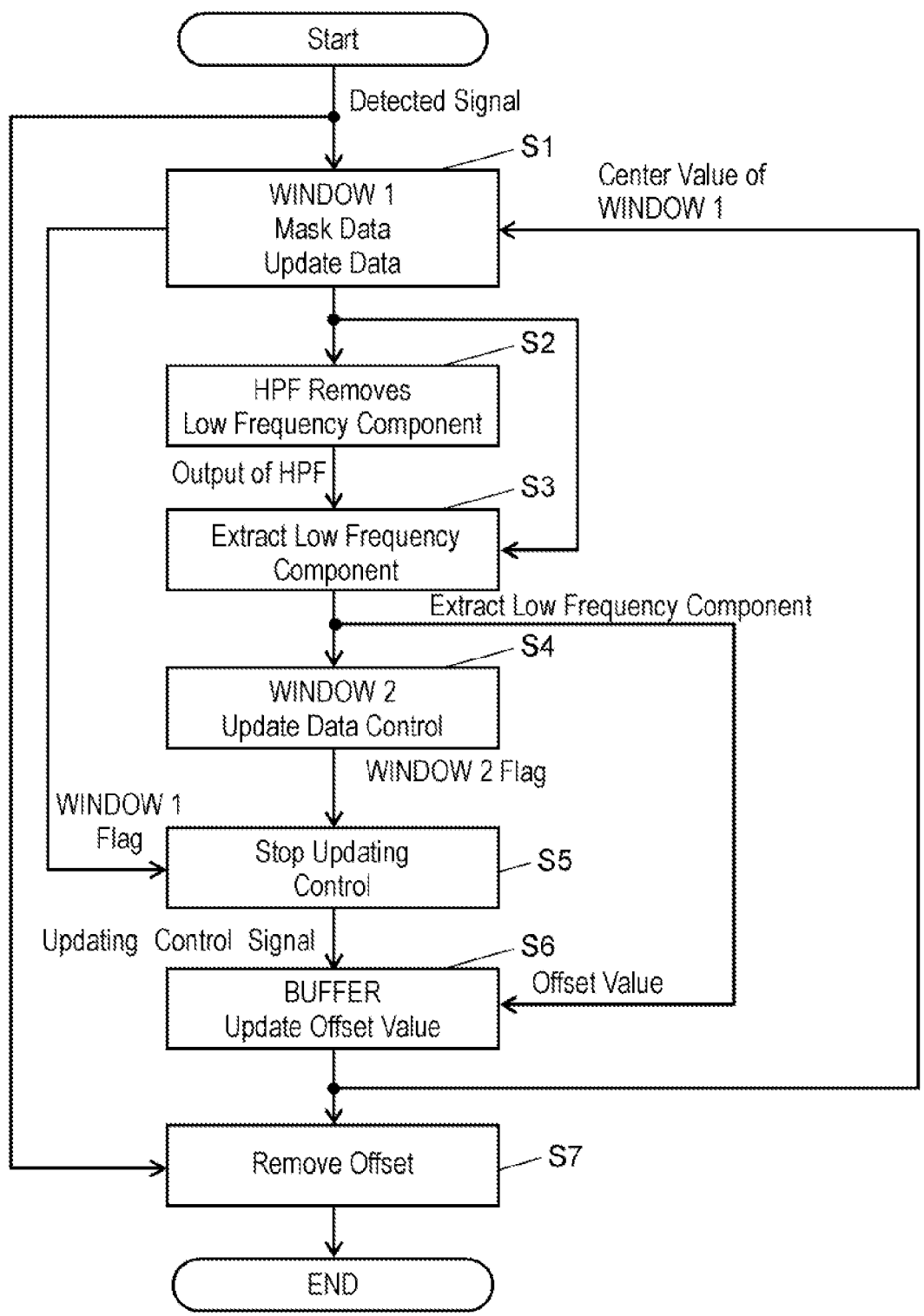
FIG. 9 is a flowchart showing the operation of the correction circuit according to Embodiment 3.
Figure 10A:
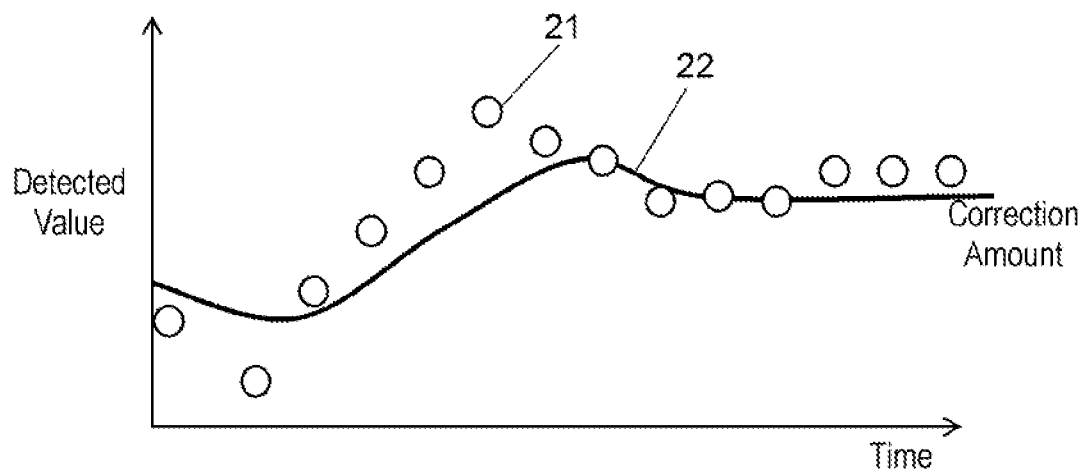
FIG. 10A shows the change with time in the value of a detected signal input to the correction circuit.
Figure 10B:
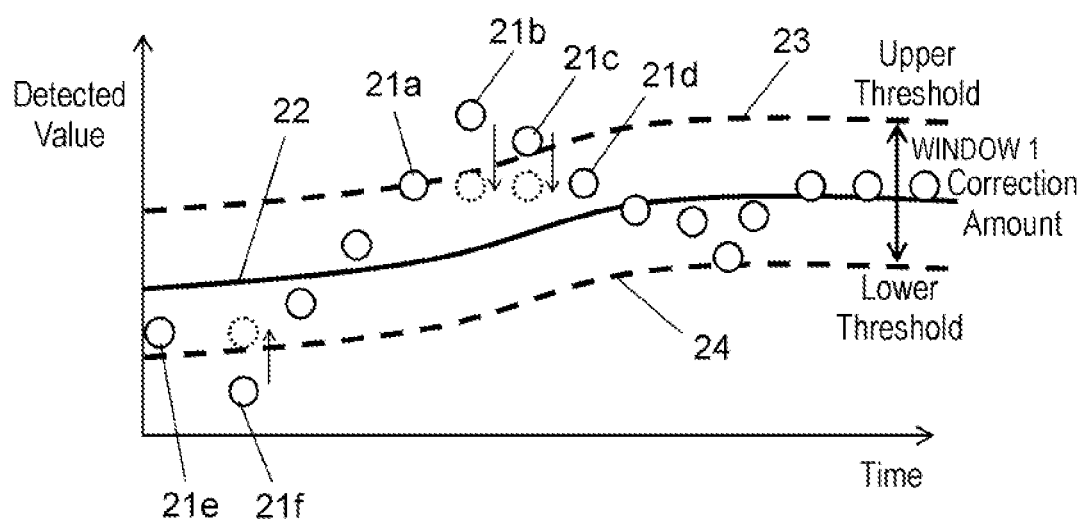
FIG. 10B is a graph showing an operation in Step S1 shown in FIG. 9.
Figure 10C:
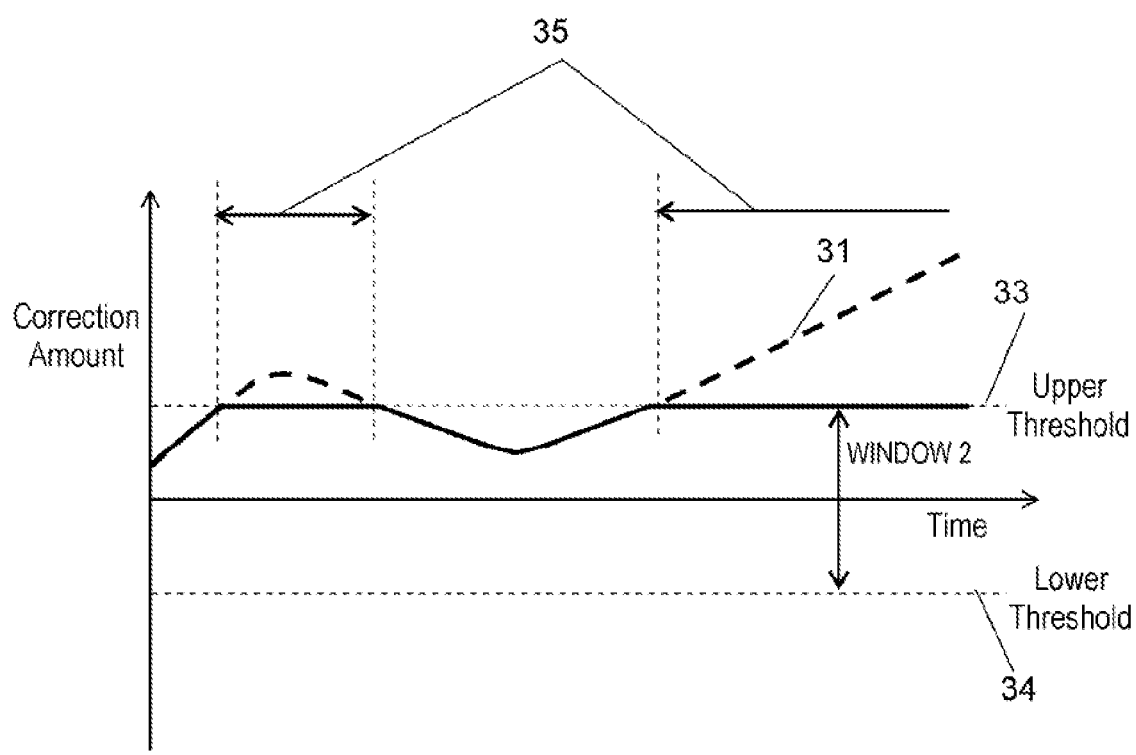
FIG. 10C is a graph showing an operation in Step S4 shown in FIG. 9.

An operation of inertia amount determination unit 16 will be detailed below with reference to FIGS. 9 to 10C. FIG. 9 is a flowchart illustrating the operation of the correction circuit according to Embodiment 3. FIG. 10A shows the change with time of the value of the detected signal input to the correction circuit. FIG. 10B is a graph showing an operation in Step S1 shown in FIG. 9. FIG. 10C is a graph showing an operation in Step S4 shown in FIG. 9.

As shown in FIG. 8, inertia amount determination unit 16 receives the output of first low-pass filter 11 and the output of correction amount generation unit 13f (the output of calculation circuit 13c). Inertia amount determination unit 16 has WINDOW 1 (a first window) for determining whether or not the output of first low-pass filter 11 is the amount of inertia, and has WINDOW 2 (a second window) for determining whether or not the output of correction amount generation unit 13f is the amount of inertia. Inertia, amount determination unit 16 controls a data masking process performed by data masking circuit 18 and the updating of the correction amount performed by correction amount storage unit 14 according to the results determined by WINDOW 1 and WINDOW 2.

FIG. 10A shows the relationship between the detected values of detection samples 21 which are signals detected at predetermined time intervals, and correction amounts 22. The detected values of detection samples 21 contain not only the output offset to be corrected but also the amount of inertia to be detected. Hence, the amount of inertia is removed from the detected values of detection samples 21.

As shown in FIG. 9, upon the detected signal being input from first low-pass filter 11, first, the center value of WINDOW 1 is received from Step S6, and WINDOW 1 is generated to perform the data masking process and data update control. Then, a WINDOW 1 flag (a first window flag) is transmitted to Step S5 (Step S1). The flag indicates whether or not correction amount storage unit 14 performs data update. The data masking process and the data update control will be detailed later.

Next, high-pass filter 13b removes low frequency components of the detected signals equal to or lower than the cut-off frequency (Step S2). Then, calculation circuit 13c subtracts the output of high-pass filter 13b from the output of first low-pass filter 11 which has been subjected to the data masking process, thereby extracting low frequency components (Step S3). In Step S4, the low frequency values extract instep S3 are received, WINDOW 2 is generated, and a WINDOW 2 flag (a second window flag) is generated. The WINDOW 2 flag indicates whether or not correction amount storage unit 14 performs data update. The WINDOW 2 flag is transmitted to Step S5 so as to perform data update control. The data update control will be detailed later.

In Step S5, the WINDOW 1 flag generated in Step S1 and the WINDOW 2 flag generated in Step S4 are received, and then, an update control signal (instruction signal) is generated. The update control signal (instruction signal) instructs correction amount storage unit 14 to stop updating the offset value. In Step S6, the update control signal generated in Step S5 is received, and the low frequency values (offset values) extracted in Step S3 are received, so that correction amount storage unit 14 updates the offset value of the BUFFER. Finally, correction unit 15 removes the offset from the output of first low-pass filter 11 based on the updated offset value (Step S7).

The data masking process and the data update control performed in Step S1 will be described below.

In Step S1, first, it is determined whether or not each detected value of the detected signal which is the output of first low-pass filter 11 is within the range of WINDOW 1. The detected values in the period outside the range of WINDOW 1 are regarded as the amount of inertia, and the detected value data is masked by data masking circuit 18. In this period, the WINDOW 1 flag is generated to cause correction amount storage unit 14 to stop updating data. In the data masking process performed by data masking circuit 18, the detected value is replaced by the detected values obtained immediately before the detected value becomes out of the range of WINDOW 1. For example, as shown in FIG. 10B, the range of WINDOW 1 is between upper threshold 23 and lower threshold 24. The center value (reference level) of WINDOW 1 is correction amount 22 at each point. In other words, upper threshold 23 of WINDOW 1 is obtained by shifting correction amount 22 upward by the width of the window, whereas lower threshold 24 is obtained by shifting correction amount 22 downward by the width of the window. The width of the window is obtained by the relation.

((Upper Threshold)−(Lower Threshold))/2.

For example, the detected values of detection samples 21b and 21c are larger than upper threshold 23 and are outside the range of WINDOW 1, as shown in FIG. 10B. Then, the preceding detected value of detection sample 21a is regarded as the detected values of detection samples 21b and 21c. In the period including detection samples 21b and 21c, inertia amount determination unit 16 causes correction amount storage unit 14 to stop updating the correction amount. Similarly, when the detected value of detection sample 21f is lower than lower threshold value 24 and is outside the range of WINDOW 1, the preceding detected value of detection sample 21e is regarded as the detected value of detection sample 2 if. In the period including detection sample 21f, inertia amount determination unit 16 causes correction amount storage unit 14 to stop updating the correction amount. Data masking circuit 18 may replace those detected values of detection samples 21 which are outside the range of WINDOW 1 by upper threshold 23 or lower threshold 24 of WINDOW 1.

The data update control performed in Step S4 will be described below. In Step S4, it is determined whether or not the low frequency values extracted in Step S3 are within the range of WINDOW 2. In the period during which the values are outside the range of WINDOW 2, a WINDOW 2 flag is generated to cause correction amount storage unit 14 to stop updating the correction amount. For example, as shown in FIG. 10C, the range of WINDOW 2 is between upper threshold 33 and lower threshold 34. The extracted low frequency values outside the range of WINDOW 2 are regarded as values produced due to the amount of inertia, and the extracted low frequency values within the range of WINDOW 2 are regarded as values produced due to other data than the amount of inertia.

For example, as shown in FIG. 10C, in the period during which extracted low frequency values 31 are outside the range of WINDOW 2, in other words, in period 35 during which extracted low frequency values 31 are larger than upper threshold 33, inertia amount determination unit 16 determines that extracted low frequency values 31 is produced due to the amount of inertia, and causes correction amount storage unit 14 to stop updating the correction amount. Similarly, in the period during which extracted low frequency values 31 are smaller than lower threshold 34, inertia amount determination unit 16 determines that extracted low frequency values 31 is produced due to the amount of inertia, and causes correction amount storage unit 14 to stop updating the correction amount.

Inertia amount determination unit 16 having this configuration allows inertial force sensor 20 to prevent the amount of inertia around the cut-off frequency of high-pass filter 13b from entering into the low frequency correction amount. Data masking circuit 18 can prevent detected signals larger than required from being input to high-pass filter 13b, thereby reducing the settling time of high-pass filter 13b.

The width of WINDOW 2 is preferably smaller than that of WINDOW 1, and is more preferably about a half of that of WINDOW 1.

In the above description, inertia amount determination unit 16 generates the update control signal based on both the WINDOW 1 flag and the WINDOW 2 flag so as to cause correction amount storage unit 14 to stop updating the correction amount. Alternatively, inertia amount determination unit 16 may generate the update control signal based on either one of the WINDOW 1 flag and the WINDOW 2 flag depending on environment in which inertial force sensor 20 is used.

Furthermore, in the above description, correction amount generation unit 13f includes data masking circuit 18 connected to the output of first low-pass filter 11 and to the input of high-pass filter 13b. Alternatively, correction amount generation unit 13f may not include data masking circuit 18.

Figure 11:
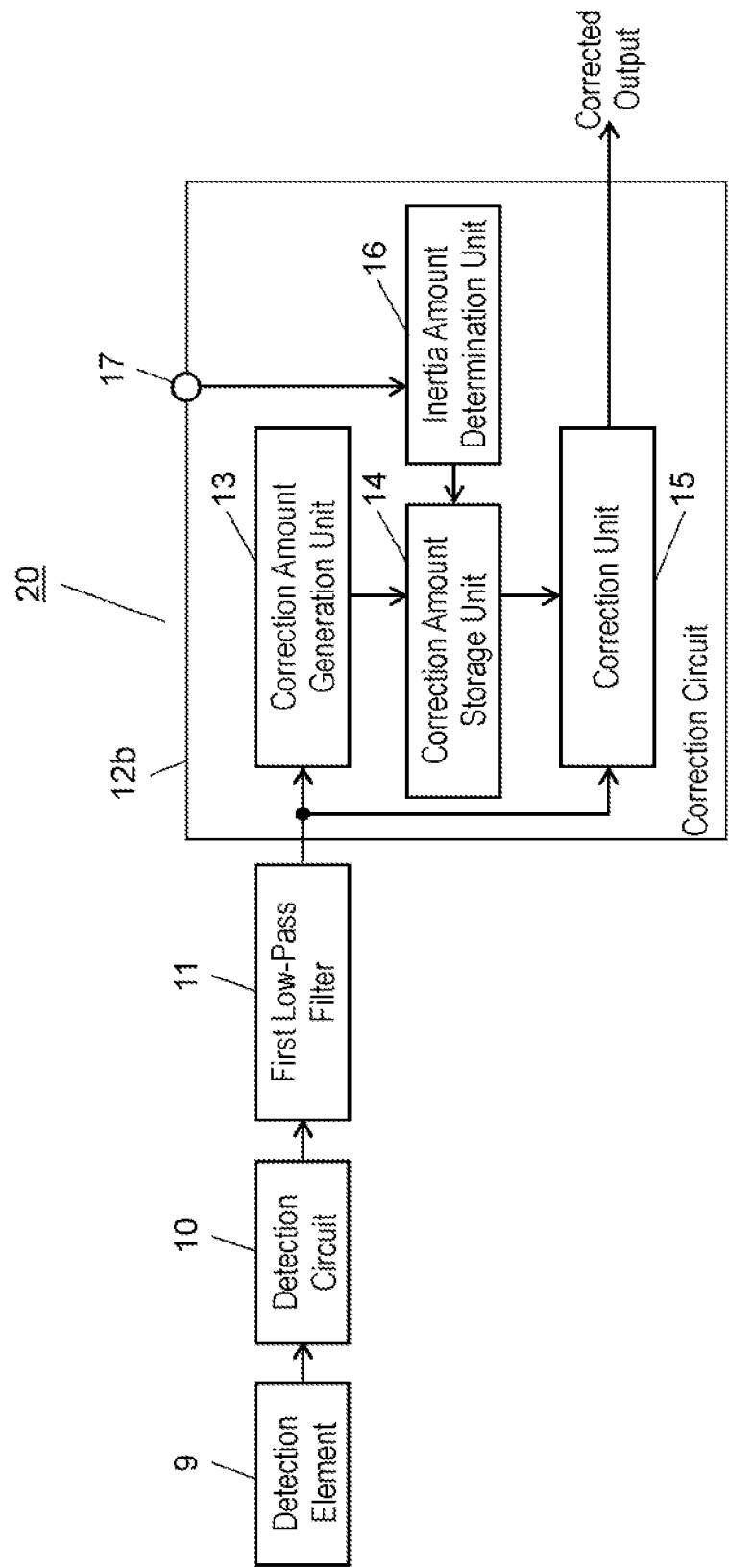
FIG. 11 is a block diagram of a correction circuit according to Embodiment 3.
Figure 12:
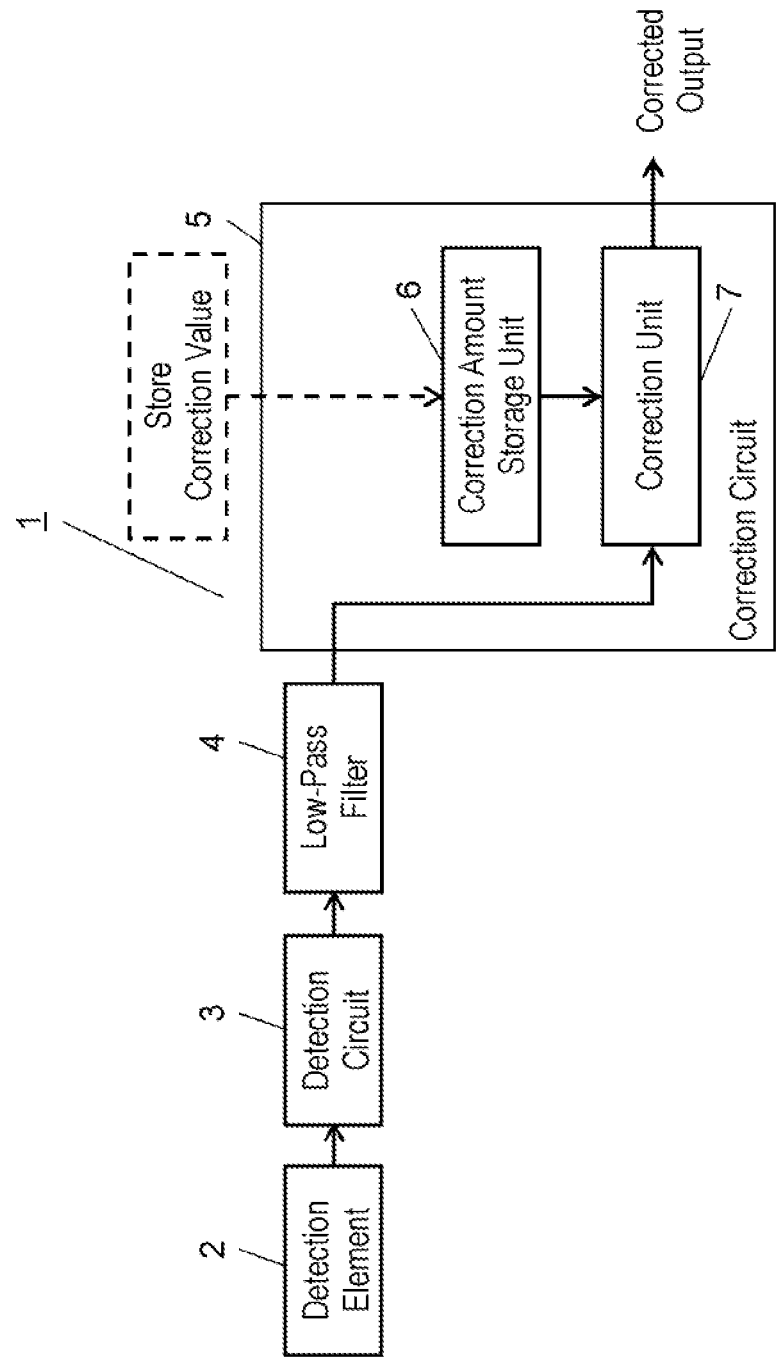
FIG. 12 is a block diagram of a conventional inertial force sensor.

FIG. 11 is a block diagram of a correction circuit according to Embodiment 3 of the present invention. More specifically, FIG. 11 is a block diagram of correction circuit 12b which is another configuration example of the correction circuit including inertia amount determination unit 16. Correction circuit 12b includes correction trigger input 17 as an input to inertia amount determination unit 16. Correction circuit 12b update the correction amount stored in correction amount storage unit 14 at the timing at which a user wants to perform correction, thereby improving user convenience and the degree of functional freedom. For example, a trigger signal in conjunction with the output of a temperature sensor (not shown) or a stress sensor not shown) can be input to correction trigger input 17. As a result, various systems can be installed to reduce erroneous correction; for example, correction can be prevented from being performed when the applied stress or temperature is below a certain level, or the correction amount can be limited. The output offset is closely related to the temperature and stress applied to the inertial force sensor. Hence, the temperature sensor and the stress sensor may be installed preferably in the same package as the inertial force sensor or near the inertial force sensor such as on the mounting substrate. This can reduce erroneous correction in correction circuit 12b. The trigger signal may be input to correction trigger input 17 based on the output of a second inertial force sensor (not shown), such as an acceleration sensor or an angular velocity sensor. With this configuration, the trigger signal can be generated without providing sensors for correction, such as a temperature sensor and a stress sensor.

INDUSTRIAL APPLICABILITY

An inertial force sensor according to the present invention is useful for an angular velocity sensor and an acceleration sensor that can be used in input devices of mobile phones, smartphones, image stabilizers of digital still cameras, and car navigation and control systems.

REFERENCE MARKS IN THE DRAWINGS 1, 8, 19, 20 Inertial Force Sensor
2, 9 Detection Element
3, 10 Detection Circuit
4 Low-Pass Filter
11 First Low-Pass Filter
5, 12, 12a, 12b Correction Circuit
13, 13a, 13d, 131 Correction Amount Generation Unit
13b High-Pass Filter
13c Calculation Circuit
13e Second Low-Pass Filter
6, 14 Correction Amount Storage Unit.
7, 15 Correction Unit
16 Inertia Amount Determination Unit
17 Correction Trigger input
18 Data Masking Circuit
40 Monitor input Terminal
41 Monitor Current/Voltage Converter
42 DC Converter
43 AGC Circuit
44 Band-Pass Filter
45 Output Amplifier
46 inverting Amplifier
47, 48 Drive Output Terminal
49 Phase Shifter
50 Clock Generator
51 Driving Circuit
60, 61 Input Terminal
62, 63 Sense Current/Voltage Converter
64 Differential Amplifier
65 Synchronous Detector
66 Detecting Output Terminal
67 Detection Circuit
101 Angular Velocity Sensor Element
102, 103 Silicon Substrate
106, 107 Arm
108, 109, 110, 111, 112, 113 Lower Electrode
114, 115, 116, 117, 118, 119 Piezoelectric Thin Elm
120, 121, 122, 123, 124, 125 Upper Electrode
120, 122, 123, 125 Upper Electrode (Driving Electrode)
121, 124 Upper Electrode (Sensing Electrode)
126 Monitoring Electrode

The invention claimed is:
1. An inertial force sensor comprising:
a detection element;
a detection circuit for detecting an amount of inertia corresponding to an inertial force applied to the detection element;
a first low-pass filter connected to an output side of the detection circuit; and
a correction circuit for correcting an output of the first low-pass filter,
wherein the correction circuit includes:
a correction amount generation unit connected to an output side of the first low-pass filter;
a correction amount storage unit connected to an output side of the correction amount generation unit;
a correction unit connected to the output side of the first low-pass filter and to an output side of the correction amount storage unit; and
an inertia amount determination unit for outputting an instruction signal,
wherein the correction amount generation unit includes:

a data masking circuit masking an output value of the first low-pass filter;

a high-pass filter connected to an output side of the data masking circuit; and a calculation circuit connected to the output side of the first low-pass filter and to an output side of the high-pass filter, the calculation circuit outputting a correction amount which is a difference between the output value of the first low-pass filter and an output value of the high-pass filter, wherein the correction amount storage unit stores the correction amount if the inertia amount determination unit outputs the instruction signal, and wherein the correction unit corrects an output value of the first low-pass filter based on a correction amount stored in the correction amount storage unit.

2. The inertial force sensor of claim 1, wherein the high-pass filter has a cut-off frequency lower than a cut-off frequency of the first low-pass filter.

3. The inertial force sensor of claim 1, wherein an output of the calculation circuit is connected to the correction amount storage unit, and wherein the output of the first low-pass filter and the output of the calculation circuit are connected to the inertia amount determination unit.

4. The inertial force sensor of claim 1, wherein the inertia amount determination unit has a first window and a second window, wherein the inertia amount determination unit generates a first window flag in a period during which the output value of the first low-pass filter is outside a range of the first window, and generates a second window flag in a period during which an output value of the correction amount generation unit is outside a range of the second window, and wherein the inertia amount determination unit generates the instruction signal based on one or both of the first window flag and the second window flag.

5. The inertial force sensor of claim 4, wherein a center value of the first window is an output value of the correction unit.

* * * * *